US012786058B2

(12) United States Patent
Vasseur et al.

(10) Patent No.: US 12,786,058 B2
(45) Date of Patent: Nov. 3, 2026

(54) SOFT SLEEP ACTIVATION OF NETWORK RESOURCES IN A GREEN ELASTIC NETWORK

(71) Applicant: Cisco Technology, Inc., San Jose, CA (US)

(72) Inventors: Jean-Philippe Vasseur, Combloux (FR); Grégory Mermoud, Venthône (CH); Eduard Schornig, Haarlem (NL)

(73) Assignee: Cisco Technology, Inc., San Jose, CA (US)

( * ) Notice: Subject to any disclaimer, the term of this patent is extended or adjusted under 35 U.S.C. 154(b) by 30 days.

(21) Appl. No.: 18/608,348

(22) Filed: Mar. 18, 2024

(65) Prior Publication Data

US 2025/0293927 A1 Sep. 18, 2025

(51) Int. Cl.
*H04L 41/0833* (2022.01)
*H04L 45/00* (2022.01)

(52) U.S. Cl.
CPC .......... *H04L 41/0833* (2013.01); *H04L 45/22* (2013.01)

(58) Field of Classification Search
CPC ..... H04L 41/0833; H04L 45/22; H04L 12/12; H04L 43/0876; H04L 45/00; H04L 45/125; H04L 45/24; H04L 45/50; H04L 45/70; H04L 41/0823
See application file for complete search history.

(56) References Cited

U.S. PATENT DOCUMENTS

| | | | | |
|---|---|---|---|---|
| 7,457,248 B1 * | 11/2008 | Ali | H04L 43/0811 370/235 |
| 7,760,668 B1 * | 7/2010 | Zinjuvadia | H04L 45/48 370/256 |
| 9,246,838 B1 | 1/2016 | Shen et al. | |
| 2015/0333953 A1 | 11/2015 | Vasseur et al. | |
| 2015/0365288 A1 * | 12/2015 | Van Der Merwe | H04L 41/0823 370/254 |
| 2017/0099210 A1 * | 4/2017 | Fardid | H04L 41/0833 |
| 2018/0213412 A1 * | 7/2018 | Makati | H04W 16/26 |
| 2020/0379839 A1 | 12/2020 | Savalle et al. | |
| 2022/0294847 A1 | 9/2022 | Rice et al. | |

(Continued)

OTHER PUBLICATIONS

I. Ashraf, F. Boccardi and L. Ho, "Power savings in small cell deployments via sleep mode techniques," 2010 IEEE 21st International Symposium on Personal, Indoor and Mobile Radio Communications Workshops, Istanbul, Turkey, 2010, pp. 307-311 (Year: 2010).*

(Continued)

*Primary Examiner* — Messeret F Gebre
(74) *Attorney, Agent, or Firm* — Merchant & Gould P.C.; Kenneth J. Heywood

(57) ABSTRACT

In one implementation, a device identifies an action to be performed in a computer network to reduce energy consumption by the computer network. The device determines whether performance of the action in the computer network will result in a performance degradation in the computer network. The device devises a rerouting strategy for the computer network, when performance of the action in the computer network will result in a performance degradation. The device implements the rerouting strategy in advance of performance of the action in the computer network, to mitigate against the performance degradation.

20 Claims, 12 Drawing Sheets

(56) References Cited

U.S. PATENT DOCUMENTS

| | | | | |
|---|---|---|---|---|
| 2023/0336022 | A1 | 10/2023 | Cella et al. | |
| 2025/0071026 | A1* | 2/2025 | Abdelaziz ............. | H04L 41/145 |
| 2025/0287287 | A1* | 9/2025 | Kommula ............. | H04W 16/22 |

OTHER PUBLICATIONS

T.-J. Ho, S.-W. Tsai and S.-M. Lin, "A Power-Efficient IoT-Based Awakening System for Healthcare," 2023 5th International Conference on Bio-engineering for Smart Technologies (BioSMART), Paris, France, 2023, pp. 1-4 (Year: 2023).*

Combes R., et al., "Optimal Online Control for Sleep Mode in Green Base Stations", Computer Networks, vol. 78, 2015, pp. 140-151.

* cited by examiner

600

900

SOFT SLEEP ACTIVATION OF NETWORK RESOURCES IN A GREEN ELASTIC NETWORK

TECHNICAL FIELD

The present disclosure relates generally to computer networks, and, more particularly, to soft sleep activation of network resources in a green elastic network.

BACKGROUND

In recent years, the global landscape has been marked by an escalating demand for green initiatives, such as reducing energy consumption across various industries. This is due to factors such as climate change and an overall push towards operational efficiency. However, these efforts also come at a time when networking technologies and their associated resource demands are experiencing unprecedented growth, largely fueled by the digital transformation of economies, the proliferation of cloud services, and the roll out of next-generation networks, such as 5G cellular networks.

Traditionally, networks have attempted to meet their increasing user demands, while still meeting their service level agreements (SLAs), by overprovisioning. Under this strategy, the network capacity is significantly expanded in anticipation of future growth and/or bursts of demand. While doing so simplifies network design and operation, it also results in inefficiencies from a green perspective, as overprovisioning also means that the resources of a network will remain idle for extended periods of time, thereby consuming more energy than actually needed.

Even with the ability to elastically scale the network to conserve energy, taking certain actions to conserve energy can still have a disruptive effect on the network. For instance, consider the case in which the action entails shutting down a certain network resource. Doing so could trigger a routing protocol convergence, leading to traffic rerouting and, possibly, temporary loops. Traffic shaping or drops will inevitably disrupt traffic, either temporarily or permanently, leading to corresponding SLA disruptions.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device identifies an action to be performed in a computer network to reduce energy consumption by the computer network. The device determines whether performance of the action in the computer network will result in a performance degradation in the computer network. The device devises a rerouting strategy for the computer network, when performance of the action in the computer network will result in a performance degradation. The device implements the rerouting strategy in advance of performance of the action in the computer network, to mitigate against the performance degradation.

Other embodiments are described below and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
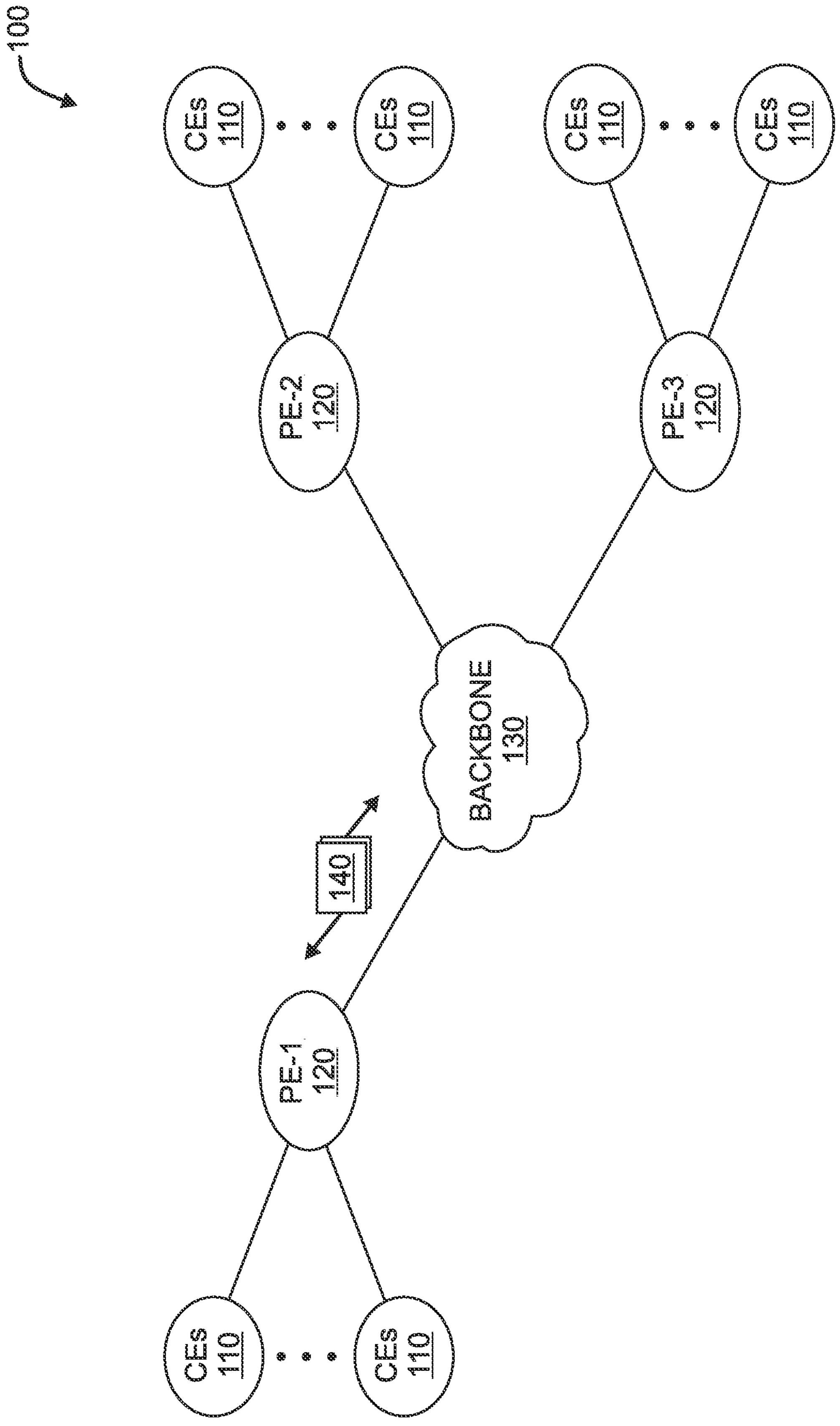
FIGS. 1A-1B illustrate an example communication network.

FIG. 1A is a schematic block diagram of an example computer network (e.g., network 100) illustratively comprising nodes/devices, such as a plurality of routers/devices interconnected by links or networks, as shown. For example, customer edge (CE) routers (e.g., router 110) may be interconnected with provider edge (PE) routers 120 (e.g., PE-1, PE-2, and PE-3) in order to communicate across a core network, such as an illustrative network backbone (e.g., network backbone 130). For example, router 110, router 120 may be interconnected by the public Internet, a multiprotocol label switching (MPLS) virtual private network (VPN), or the like. Data packets 140 (e.g., traffic/messages) may be exchanged among the nodes/devices of the computer network (e.g., network 100) over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router (e.g., router 110) shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

- 2a.) Site Type B1: a site connected to the network using two MPLS VPN links (e.g., from different Service Providers), with potentially a backup link (e.g., a 3G/4G/5G/LTE connection).
- 2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
- 2c.) Site Type B3: a site connected to the network using two links connected to the public Internet, with potentially a backup link (e.g., a 3G/4G/5G/LTE connection). Notably, MPLS VPN links are usually tied to a committed service level agreement (SLA), whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router (e.g., router 110) connected to PE-2 and a second CE router (e.g., router 110) connected to PE-3.

Figure 1B:
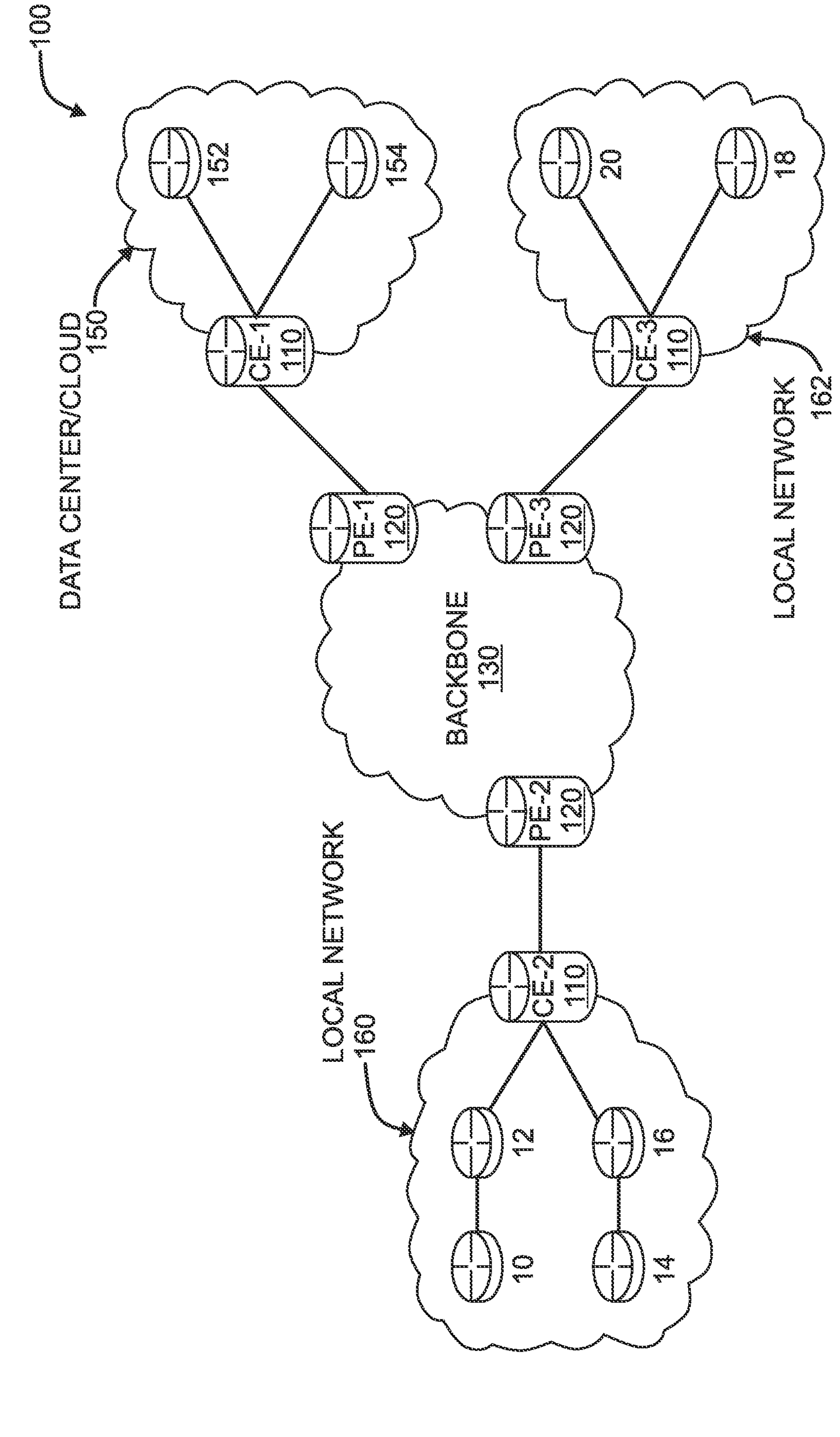

FIG. 1B illustrates an example of network 100 in greater detail, according to various implementations. As shown, network backbone 130 may provide connectivity between devices located in different geographical areas and/or different types of local networks. For example, network 100 may comprise local and/or branch networks that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in network backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
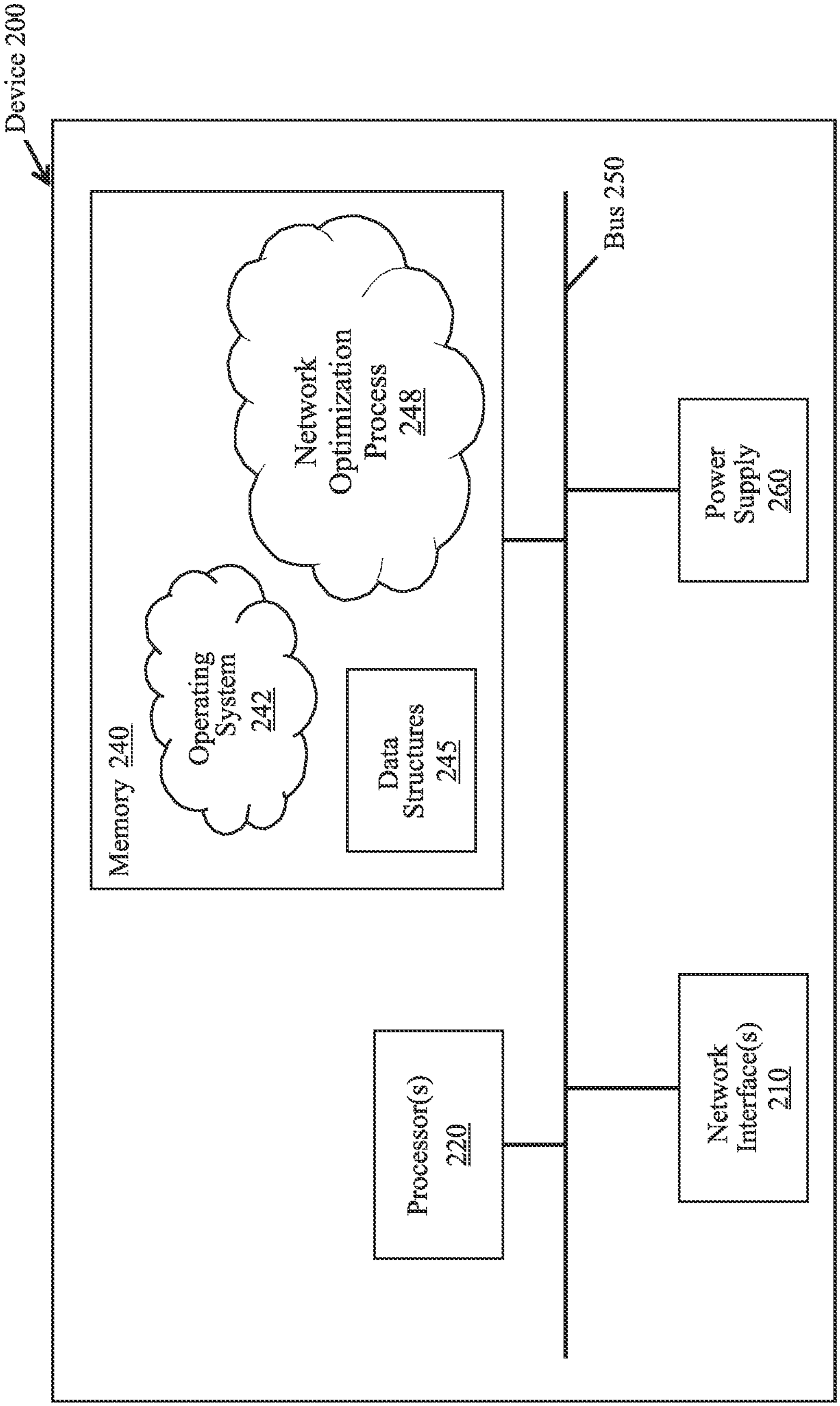
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers (e.g., router 120), CE routers (e.g., router 110), nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces (e.g., network interfaces 210), one or more processors (e.g., processor(s) 220), and a memory 240 interconnected by a system bus 250 and powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, network optimization process 248 may include computer executable instructions that, when executed by processor(s) 220, cause device 200 to perform the techniques described herein. To do so, in some implementations, network optimization process 248 may utilize machine learning. In general, machine learning is concerned with the design and the development of techniques that take as input empirical data (such as network statistics and performance indicators) and recognize complex patterns in these data.

In various implementations, network optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network optimization process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network optimization process 248 may use a generative model to generate synthetic network traffic based on existing user traffic to test how the network reacts. Example generative approaches can include, but are not limited to, generative adversarial networks (GANs), large language models (LLMs), other transformer models, and the like.

As noted above, in software defined WANs (SD-WANs), traffic between individual sites is sent over tunnels. The tunnels are configured to use different switching fabrics, such as MPLS, Internet, 4G or 5G, etc. Often, the different switching fabrics provide different quality of service (QOS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Typically, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is often performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
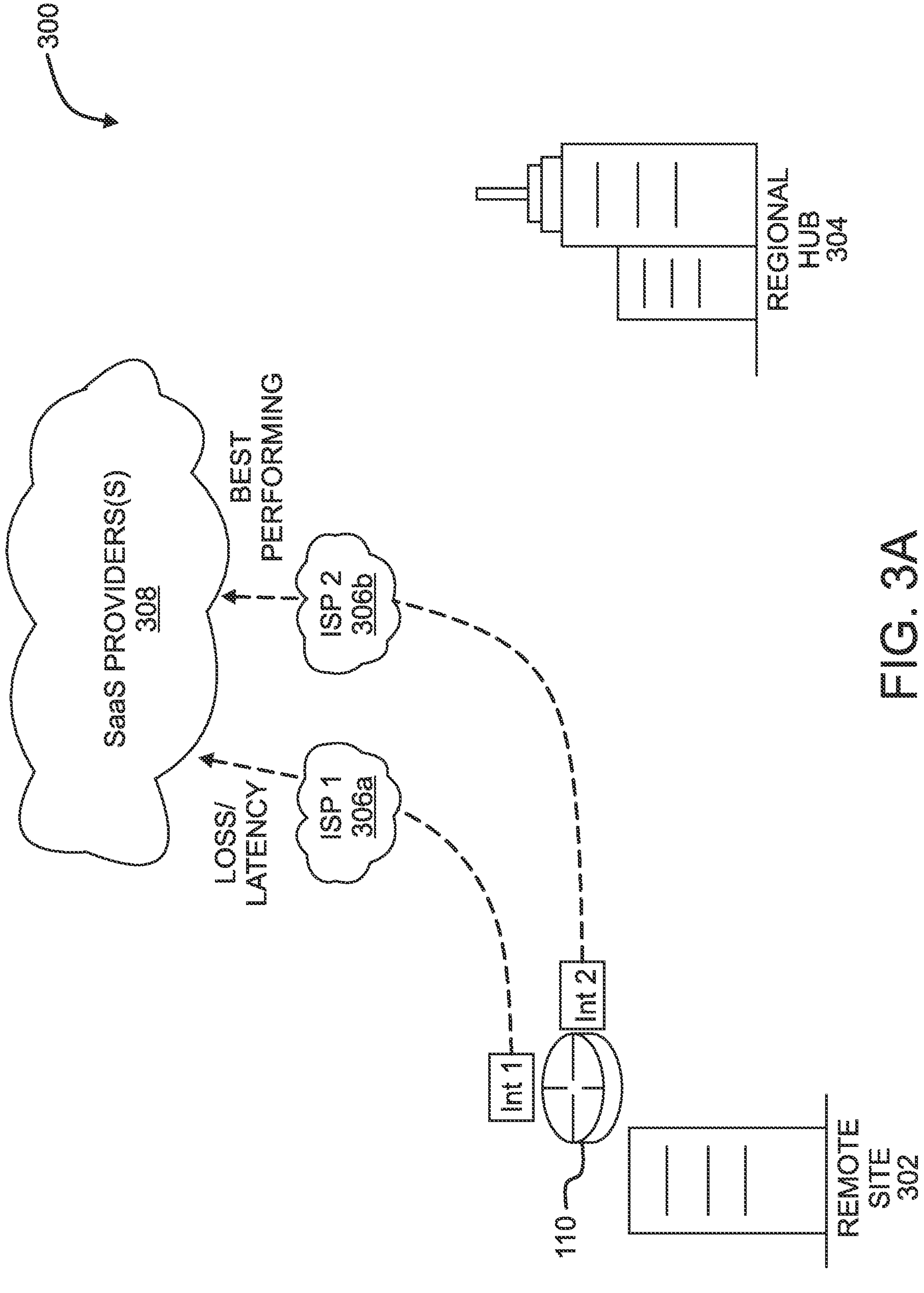
FIGS. 3A-3B illustrate example network deployments.
Figure 3B:
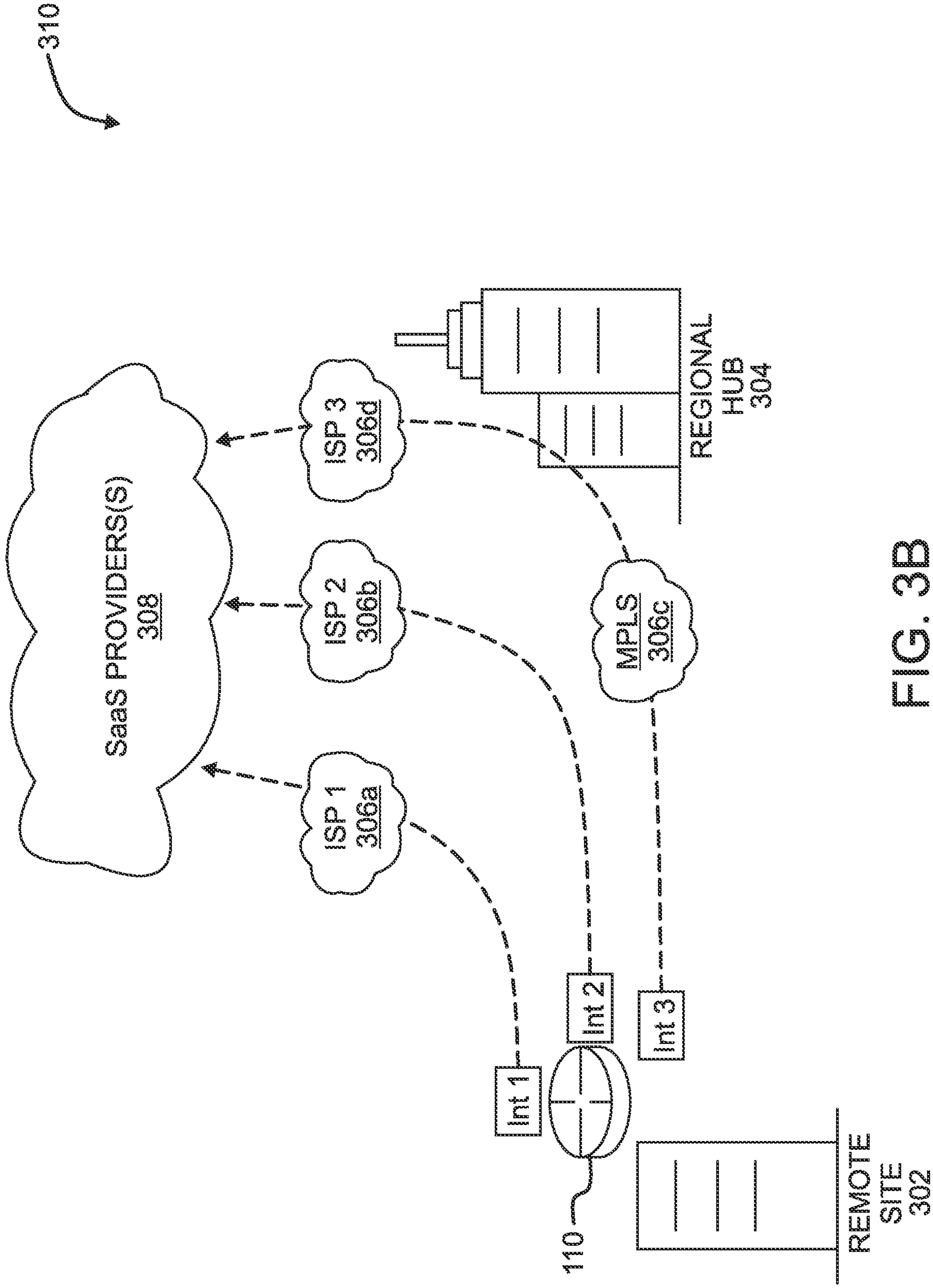

FIGS. 3A-3B illustrate example network deployments (e.g., network deployment 300, network deployment 310, respectively). As shown, a router 110 located at the edge of a remote site 302 may provide connectivity between a local area network (LAN) of the remote site 302 and one or more cloud-based, SaaS providers (e.g., provider(s) 308). For example, in the case of an SD-WAN, router 110 may provide connectivity to SaaS provider(s) (e.g., provider(s) 308) via tunnels across any number of networks 306. This allows clients located in the LAN of remote site 302 to access cloud applications (e.g., Office365™, Dropbox™, etc.) served by SaaS provider(s) (e.g., provider(s) 308).

As would be appreciated, SD-WANs allow for the use of a variety of different pathways between an edge device and a SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., network interfaces 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider(s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
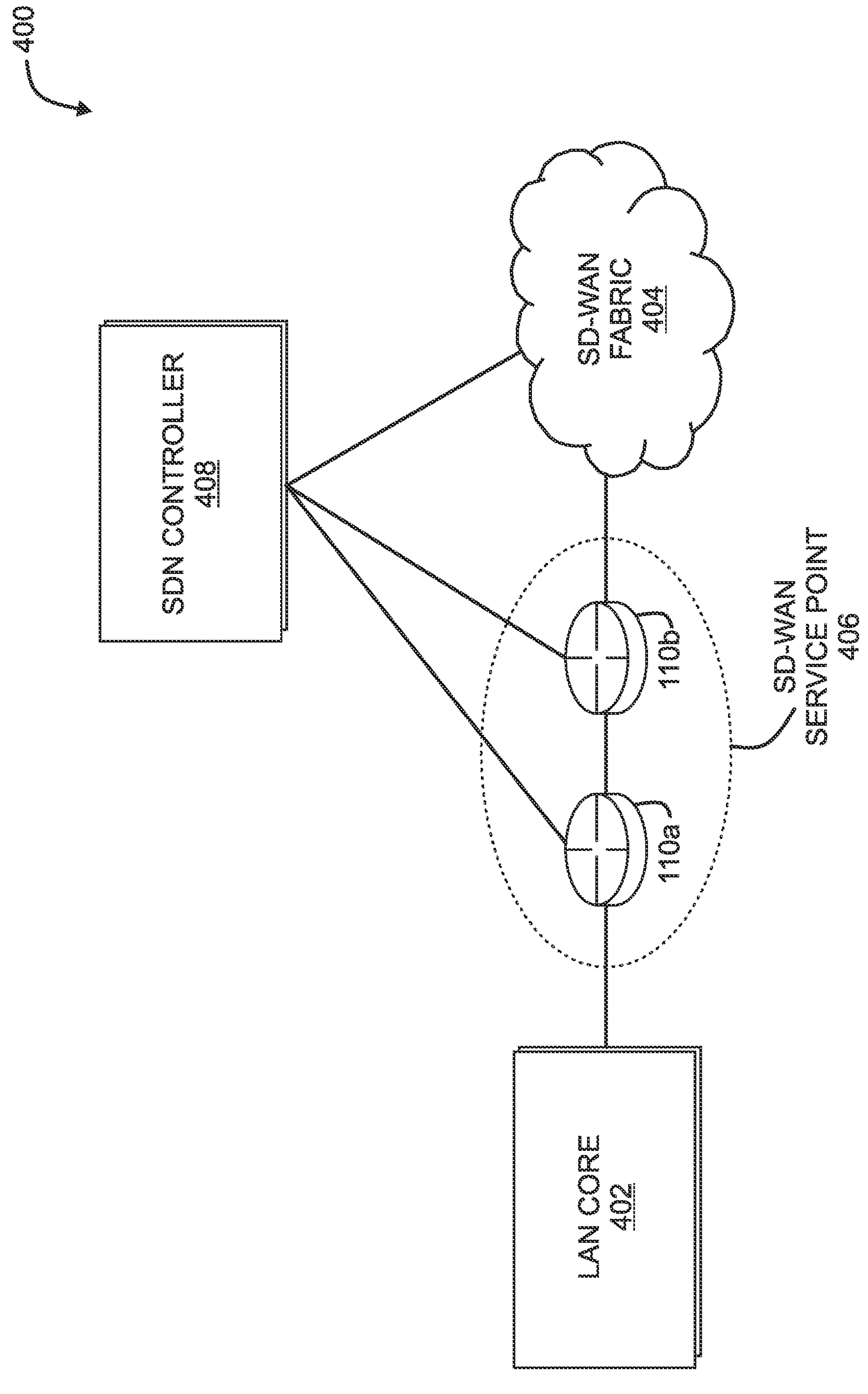
FIG. 4 illustrates an example of a software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging a SaaS model. Consequently, the number of applications that became network-centric has grown approximately exponentially with the raise of SaaS applications, such as Office365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of service provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

- New in-house applications being deployed;
- New SaaS applications being deployed everywhere in the network, hosted by a number of different cloud providers;
- Internet, MPLS, LTE transports providing highly varying performance characteristics, across time and regions;
- SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, application aware routing generally refers to the ability to route traffic so as to satisfy the requirements of the application, as opposed to exclusively relying on the (constrained) shortest path to reach a destination IP address. Various attempts have been made to extend the notion of routing, constrained shortest path first (CSPF), link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application.

Figure 5:
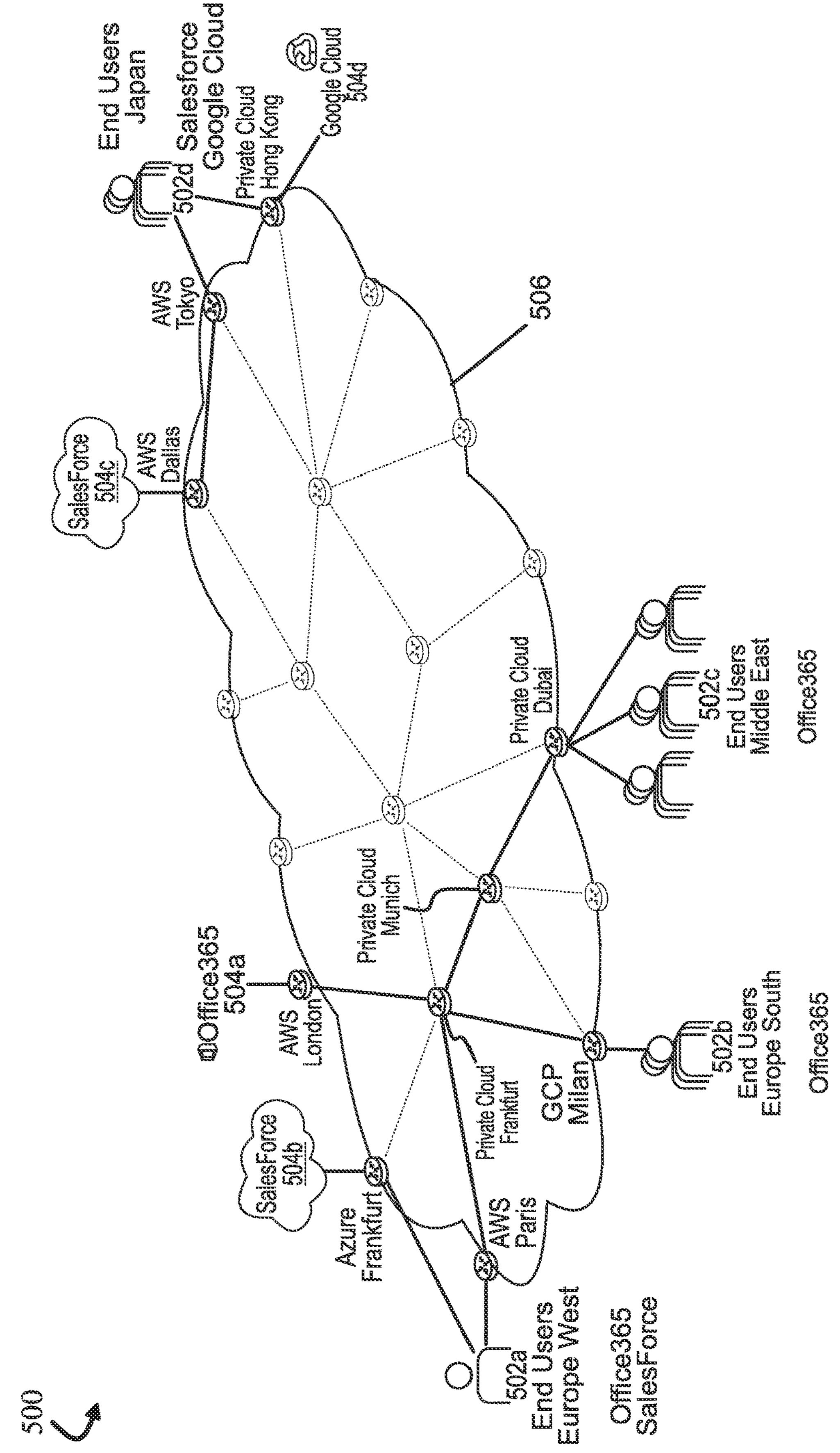
FIG. 5 illustrates an example of a cloud network architecture.

FIG. 5 illustrates an example of a cloud network architecture 500. The cloud network architecture 500 may be a geographically distributed system designed to facilitate communications and interactions among end users 502 (e.g., 502*a*-502*d*) and cloud-hosted applications 504 (e.g., 504*a*-504*d*) across various locations. Such applications may include a first application 504*a* (Office365), a second application 504*b* (e.g., a first instance of Salesforce), a third application 504*c* (e.g., a second instance of Salesforce), a fourth application 504*d* (e.g., Google Cloud), etc. Distributed across network 506 may be any number of end users 502 at different locations that access the various instances of the cloud-hosted applications 504. Communication between the end users 502 and the cloud-hosted applications 504, which may be hosted across multiple cloud platforms (e.g., Azure, AWS, Google Cloud, private cloud, etc.), may occur via data communication across network pathways between nodes of network 506.

As noted above, energy and other resource costs have been on the rise, significantly impacting both households and major industries. For instance, electricity prices in some regions have surged by twenty to thirty percent within a year. This increase has been attributed to various factors such as heightened demand and geopolitical issues affecting fuel supplies. Additionally, the energy consumption in key sectors like technology is noteworthy. Data centers, crucial for our digital world, consume about one to two percent of global energy, translating to hundreds of terawatts annually. This amount is only increasing. Furthermore, the telecom industry is also a significant energy consumer. For example, it's estimated that global telecoms use over sixty billion kilowatt-hours of energy per year, a figure that's growing with the expansion of networks like 5G.

The urgency for energy saving is accentuated by both economic and environmental needs. Decreasing energy usage is pivotal in combating climate change, as it reduces the demand for fossil fuels, thereby lessening greenhouse gas emissions. Simple measures like adopting energy-efficient appliances and mindful usage can have profound impacts. For large tech companies and data centers, energy-saving measures are even more crucial due to their high energy demands. The combined efforts of individuals and large enterprises in reducing energy usage can significantly contribute to environmental protection.

"Green IT" is being ushered to the forefront against this backdrop. This approach is exemplified by the practice of using information technology in a way that minimizes environmental impact, emphasizing resource efficiency. For instance, the adoption of energy-efficient servers and optimized data center layouts can markedly reduce energy consumption. In the telecom sector, innovations such as energy-efficient network technologies can substantially cut down power usage. The implementation of Green IT not only aids in environmental conservation but also offers economic benefits through reduced energy costs. By integrating energy-saving measures and Green IT practices, substantial progress can be realized in creating a sustainable and eco-friendly future, addressing both the escalating energy demands and the urgent need to protect our environment.

For example, traditional network designs have approached resource scaling through a traffic engineered network approach or an overprovisioned network approach. The traffic engineered network approach may include operating the network according to the principle that considering a given traffic demand and network capacity, an optimal traffic placement may be found to meet SLAs. This approach is sometimes applied in interior gateway protocol (IGP) traffic engineered (TE) technologies, multiprotocol label switching (MPLS) TE technologies, path computation element (PCE) technologies, etc. The pros of this approach include cost reduction (as compared to over-provisioning) and high SLA/SLO satisfaction. The cons of this approach are that it has high complexity and is inflexible to sudden demand changes.

The overprovisioned network approach may include operating the network according to the principle that network traffic demand can be monitored and the network capacity may be overprovisioned to meet current demands and potential demand fluctuations (e.g., increased demand). This approach is sometimes applied IP with limited IGP-based TE technologies, etc. The pros of this approach include its simplicity. The cons of this approach are that it cannot be sustained in terms of return on investment (ROI) (e.g., issues with over-the-top providers). That is, it is a very costly approach with respect to owning and operating idle capacity out of an abundance of caution.

To summarize, networks have been vastly differing in terms of design principles: some of them have adopted an "over-provisioning" strategy according to which lots of resources are provisioned thus allowing for more simple designs (e.g., no QoS, no complex TE, ease of troubleshooting, etc.). In contrast, other networks have been designed with limited and highly optimized resources, thus requiring the use of more complex technologies to optimize traffic, SLA, and so on. In all cases, current communication networks have traditionally been designed with an "always-on" approach, with network equipment continuously running at full speed/capabilities, resulting in a considerable amount of energy being drained, often unnecessarily in the context of actual demand. Overprovisioning of network equipment (e.g., deploying more, or bigger hardware) in expectation of usage growth down the line, can lead to additional energy wastage until such growth materializes.

However, for most networks, traffic demand is not constant and usually follows daily cyclical patterns with periods of highs and lows (e.g., see network traffic usage time series 600). In enterprise environments, the network is predominantly utilized during traditional 9:00 to 17:00 business hours, with little or no use outside this interval at most locations. A similar observation can be made in the context of Service Provider Networks, where peak network load is usually in the 17:00 to 22:00 before gradually slowing down over the night.

Figure 6:
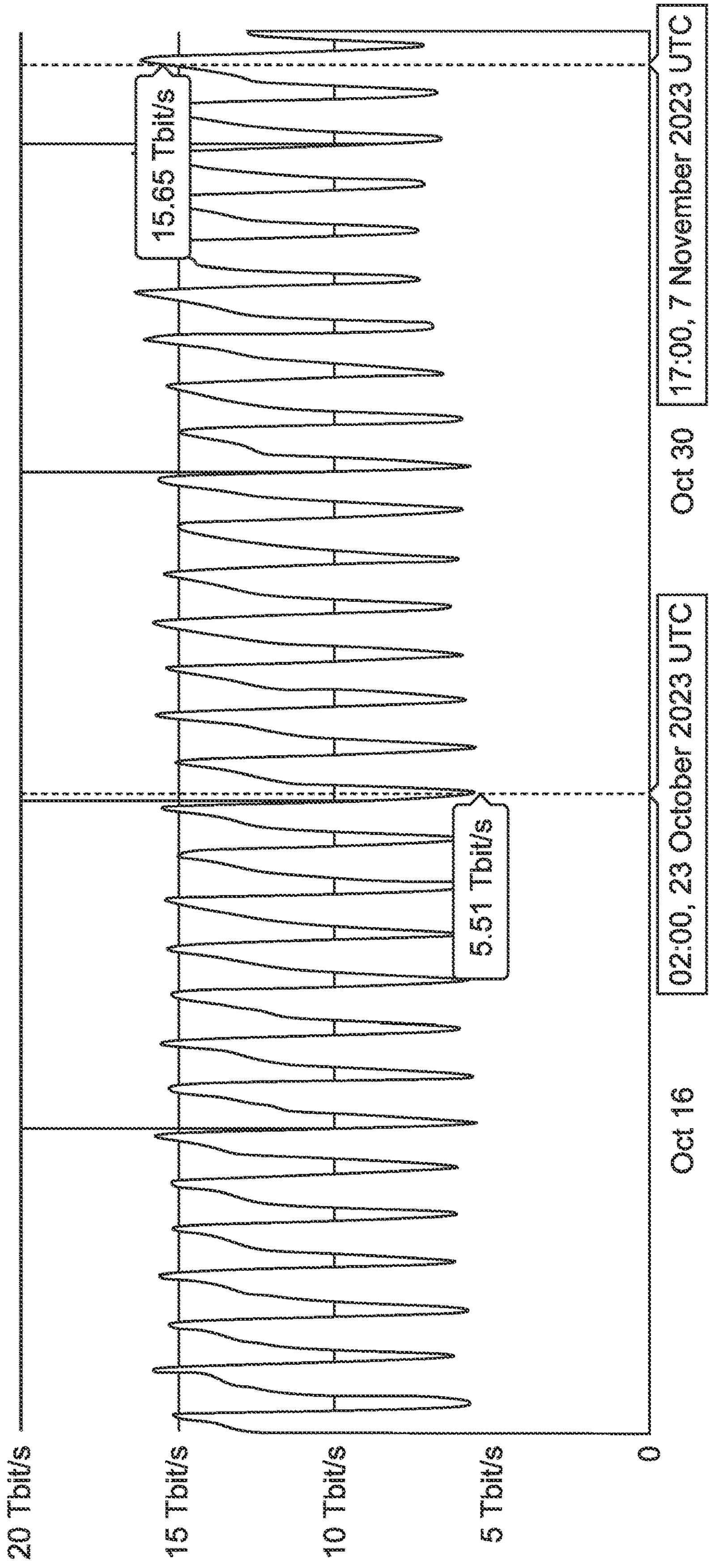
FIG. 6 illustrates an example of a network traffic usage time series.

For instance, FIG. 6 illustrates an example of a network traffic usage time series 600. As shown, network traffic usage time series 600 illustrates the fluctuation in network resource demands that cyclically occur over a period of time. In order for networks to accommodate this traffic in a manner that will satisfy SLA requirements, the network must be adequately provisioned with network resources (e.g., computational resources, communication resources, infrastructure, equipment, power, etc.) in a manner than can accommodate cyclical traffic bursts.

The network traffic usage time series 600 may be a DE-CIX Internet Exchange network traffic usage graph illustrating network traffic utilization over a thirty-day period (e.g., Oct. 9, 2023-Nov. 8, 2023). In network traffic usage time series 600, traffic usage cycles between lows of approximately six terabits per second and highs of approximately fifteen terabits per second over twenty-four-hour periods. As can be appreciated from network traffic usage time series 600, the network must be provisioned in order to handle the fifteen terabits per second load. However, the network resources in place to accommodate the fifteen terabits per second load are laying idle and are consequently underutilized when the network is experiencing the six terabits per load.

Facing resource consumption challenges and increasing environmental concerns, organizations of all sizes are now looking for ways to reduce the energy consumption of their communications networks. However, there are no existing mechanisms that can balance resource consumption/conservation with the necessity of SLA/QoE satisfaction.

AI-Driven Elastic Network to Reduce Energy Consumption

According to various embodiments, the techniques herein allow for the creation of AI-driven elastic networks that are able to reduce energy consumption, while still satisfying the various SLAs of the applications that they support. For simplicity, such a network is also referred to herein as a "GreenNetAI network." In some aspects, GreenNetAI networks may operate according to the principle that, considering a given traffic demand, the objective is to make the network elastic and reduce energy consumption, while preserving SLAs/QoE and avoiding traffic disruption. More specifically, the introduced GreenNetAI networks may be elastic networks capable of dynamically adapting their network architectures, configurations, equipment, etc. to meet traffic demand in a manner that reduces/minimizes resource consumption, while ensuring little to no traffic disruptions and that their SLAs are satisfied.

As described in greater detail below, a GreenNetAI network may operate by leveraging various mechanisms that can be used at the scale of a large enterprise network, to conserve resources, save energy, reduce costs, reduce greenhouse gas (GHG) emissions, increase operation efficiency, etc. while maintaining Quality of Experience (QoE), according to specific constraints and objectives. This approach operates on the wide range of levers and arbitrage opportunities available in networking. For example, in a given network traffic may still be able to flow through some other path with a worse but still acceptable SLA while some more expensive (e.g., from a resource consumption perspective) devices or paths are powered down. In some instances, these techniques main QoE by making use of digital twins, various models (e.g., for resource consumption), network state retrievals, and/or the monitoring of network QoE and SLA metrics in the form of positive/negative feedback.

Illustratively, the techniques described herein may be performed by hardware, software, and/or firmware, which may include computer executable instructions executed by the processor(s) 220 (or independent processor of network interfaces 210) to perform functions relating to the techniques described herein, such as in conjunction with network optimization process 248.

Figure 7:
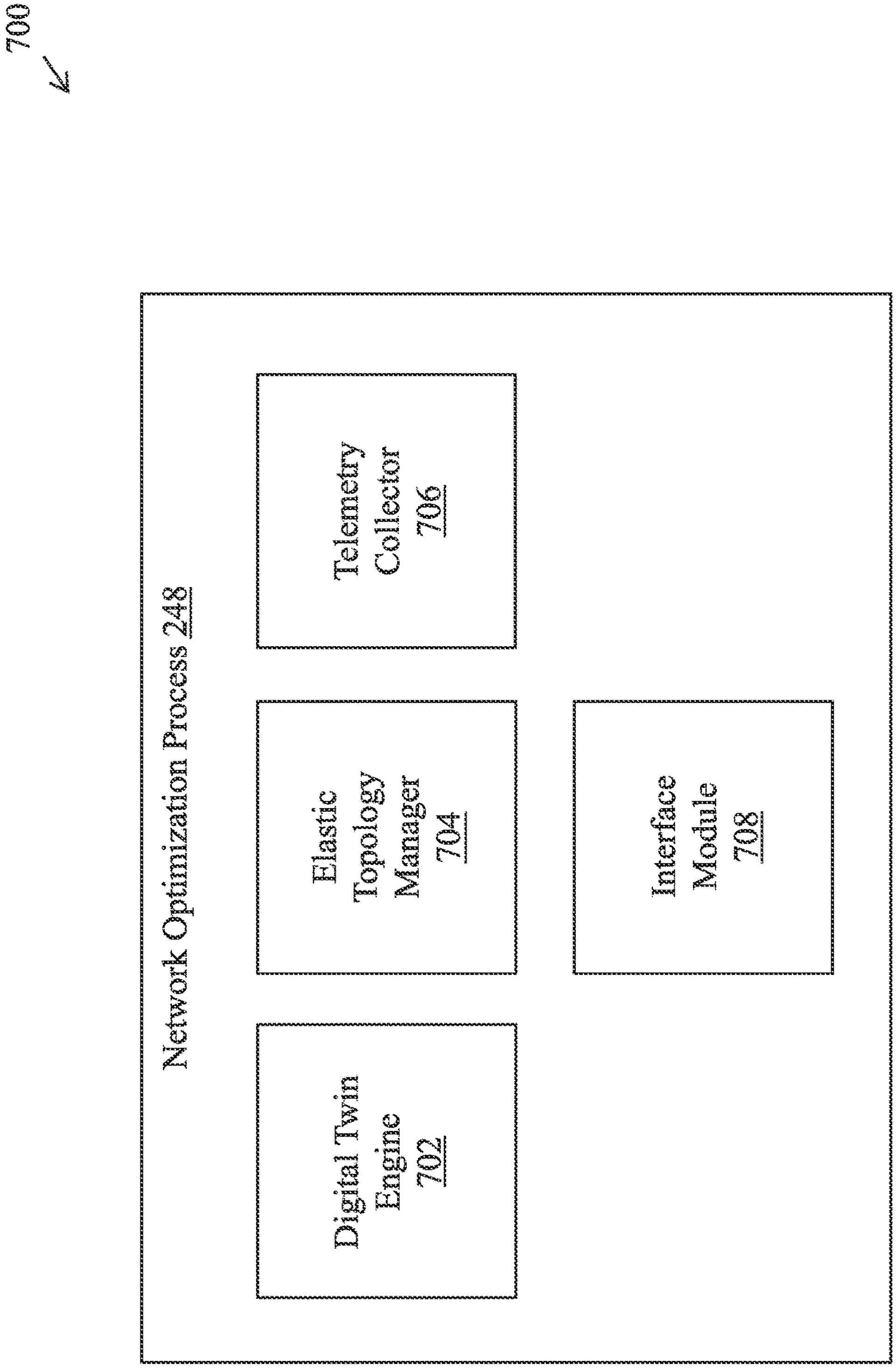
FIG. 7 illustrates an example architecture to implement an artificial intelligence (AI)-driven elastic network to reduce energy consumption.

Operationally, FIG. 7 illustrates an example architecture 700 for implementing a GreenAINet network, according to various implementations. At the core of architecture 700 is network optimization process 248, which may be executed by a controller for a network or another device in communication therewith. For instance, network optimization process 248 may be executed by a controller for a network (e.g., SDN controller of an SD-WAN network, a controller of a cloud network, etc.), a particular networking device in the network (e.g., a router, a firewall, etc.), a server, another device or service in communication therewith, or the like.

As shown, network optimization process 248 may include any or all of the following components: a digital twin engine 702, elastic topology manager 704, a quality of telemetry collector 706, and/or an interface module 708. As would be appreciated, the functionalities of these components may be combined or omitted, as desired. In addition, these components may be implemented on a singular device or in a distributed manner, in which case the combination of executing devices can be viewed as their own singular device for purposes of executing network optimization process 248.

Figure 8:
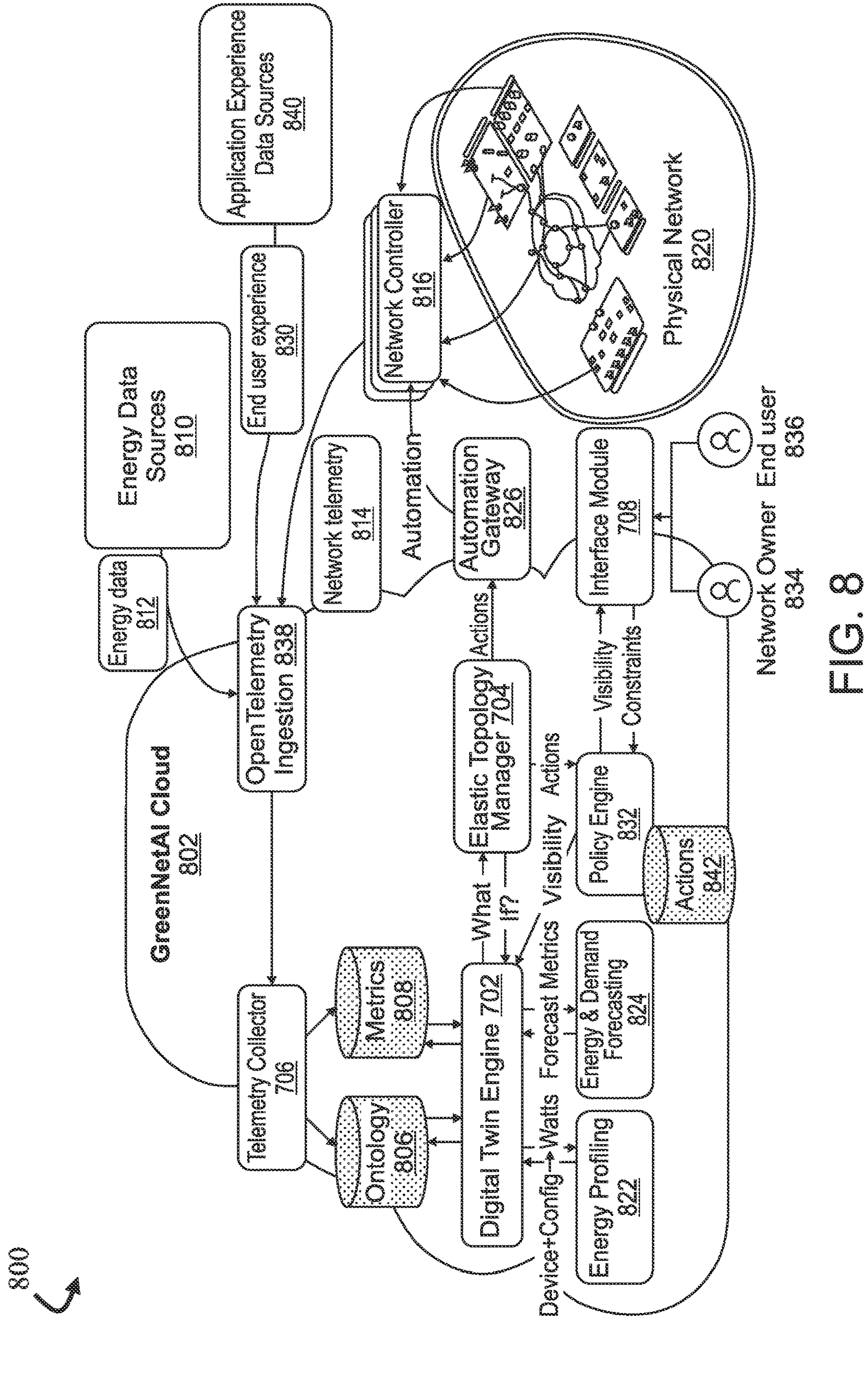
FIG. 8 illustrates an example of the interactions of the components of FIG. 7 in an AI-driven elastic network.

The interactions of the components of architecture 700 are shown in greater detail in FIG. 8 to implement a GreenNetAI cloud 802, in various embodiments. As shown in architecture 800 in FIG. 8, GreenNetAI cloud 802 may exist on top of a physical network 820 controlled by any number of network controllers 816 (e.g., SDN controller 408, etc.).

According to various embodiments, GreenNetAI cloud 802 may rely on a digital twin of physical network 820 to perform its energy-conscious optimizations. To this end, telemetry collector 706 may obtain various information from physical network 820, energy data sources 810, and/or application experience data sources 840, to form a digital twin of physical network 820. In some implementations, telemetry collector 706 may obtain any or all of this information via an OpenTelemetry-based ingestion mechanism 838. However, further implementations provide for telemetry collector 706 doing so by making API calls, accessing one or more data brokers, or the like, either on a pull or push basis.

More specifically, telemetry collector 706 may obtain network telemetry 814 from various entities associated with physical network 820, such as network controllers 816. For instance, network telemetry 814 may include information regarding the state of physical network 820 such as topology information, device information, configuration information, path metrics, routing information, direct energy consumption measurements, or any other information needed from physical network 820 to form a digital twin of physical network 820.

Telemetry collector 706 may also obtain energy data 812 from energy data sources 810. By way of example, energy data sources 810 may include, but are not limited to, services such as Electricity Maps, re.alto, FlatPeak, or the like, that provide energy data 812 (e.g., via various APIs, etc.). In general, energy data 812 may indicate information such as, but not limited to, the energy consumption by the various locations of physical network 820, energy costs, energy demand and supply information, and the like.

Telemetry collector 706 may further obtain QoE telemetry 830 from application experience data sources 840 that is indicative of the experience of an end user, such as end user 836 of the network. For instance, application experience data sources 840 may include services such as ThousandEyes, Nexthink, Aternity, 1E Solutions, Lakeside, or other services that are able to capture digital employee experience (DEX) information that can be included in QoE telemetry 830.

According to various embodiments, network optimization process 248 may represent physical network 820 as a digital twin using the information collected by telemetry collector 706. To this end, network optimization process 248 may rely on two primary building blocks: an ontology 806, stored in a relational database such as EdgeDB or PostgreSQL, and metrics 808, stored in a time-series database such as QuestDB. Generally, ontology 806 maps every network device, user, applications, and flows in physical network 820 to a digital equivalent, stored in database. Meanwhile, metrics 808 may store quantitative, time-varying data corresponding to each entity of ontology 806.

For instance, ontology 806 may represent a router as an entry in a Device table of its underlying database. Each interface of the router is represented in the Interface table, and a relation between them is defined. An application flow originating from a user's laptop, such as end user 836, to an application server in the cloud may be represented in a TrafficFlow table, with relations to both the laptop's and server's entries in an Endpoint table of the database.

A plurality of metrics in metrics 808 may be associated with each such entity in ontology 806. For instance, metrics bytes_per_sec and packets_per_sec can be associated with every entry in the TrafficFlow table. Metrics joule_per_bytes (i.e., traffic-dependent energy consumption) or baseline_power (i.e., baseline energy consumption, even in absence of traffic) can be associated with an interface, a chip, a blade, or an entire device. Physical entities such as routers, switches, and servers may associated with Location entries, for which metrics such as usd_per_watthour and kg_co2_eq_per_watthour, which denote the price in USD per watt hour and the kilograms of Carbon Dioxide (CO2) equivalent of greenhouse gas (GHG) emissions for 1 watt hour, which may be included in energy data 812 from energy data sources 810, which may provide electricity cost and carbon footprint per location across the world. Similarly, metrics 808 may also relate QoE telemetry 830 and/or network telemetry 814 with their corresponding entities in ontology 806.

In various embodiments, digital twin engine 702 may be responsible for reading the data stored in ontology 806 and metrics 808, to perform any or all of the following tasks:

1. Infer missing data: for instance, this may be the case of joule_per_bytes and baseline_power for device components (e.g., interfaces, chipsets, etc.) for which direct power consumption readings are not available. In this case, digital twin engine 702 may make use of an energy profiling module 822 (e.g., a subcomponent of digital twin engine 702) that is configured to estimate the value of joule_per_bytes or baseline_power. Energy profiling module 822 is described in greater detail below.
2. Forecast data: another capability of GreenNetAI cloud 802 is its ability to proactively power on or off some network devices and infrastructure in physical network 820, based on the estimated energy cost, demand, and supply. To this end, digital twin engine 702 may also rely on another subcomponent of it: energy and demand forecasting engine 824.
3. Simulate what-if scenarios: to ensure that any actions taken by GreenNetAI cloud 802 do not inadvertently cause undesired effects, digital twin engine 702 may also leverage a what-if engine subcomponent (not shown) to assess the outcome of a given action, both in terms of the resulting power consumption or carbon footprint, but also in terms of the impact on the end user experience. To do so, digital twin engine 702 must be able to simulate an alternate view of physical network 820 wherein one or more changes have been applied, and infer key metrics of interest (e.g., energy consumption, traffic load, etc.).

In various implementations, elastic topology manager 704 may be responsible for minimizing the energy consumption of physical network 820 (e.g., in terms of GHG emissions, energy costs, power or energy consumption, etc.), given a set of operational constraints, such as maintaining user experience metrics (UEM) above a given threshold for different applications, or limiting the risk of connectivity failure in different scenarios (single/double link/node failures). To this end, elastic topology manager 704 may rely on a subcomponent, policy engine 832, which is responsible for maintaining a set of allowed and disallowed actions 842, based on these constraints. Indeed, depending on the number of users in physical network 820, the types of applications they use, etc., different requirements may be inferred and used to formulate policies for policy engine 832. For instance, banks and hospitals may have very strict operational requirements at the expense of additional energy consumption, whereas retail, entertainment, or smaller businesses may be more flexible in terms of their operational requirements, allowing for even greater reductions in the energy consumption of physical network 820. Policy engine 832 may also provide some visibility as to the constraints during any what-if assessments of potential actions 842.

In various embodiments, elastic topology manager 704 may proceed as follows:

1. Query digital twin engine 702 for the current state of physical network 820, based on its digital twin.
2. Identify saving opportunities (e.g., redundant paths, over-provisioned devices, movable or deferrable workloads) and produce an estimated saving.
3. Simulate the changes using digital twin engine 702 and validate that they remain within operational constraints maintained by policy engine 832 (e.g., link loads below 80%, single-link failure protection).
4. Generate recommendations and or apply the change via an automation gateway 826.

The list of actions 842 triggered elastic topology manager 704 to reduce energy consumption while preserving QoE/DEX can be quite varied. For instance, set of allowed and disallowed actions 842 may include, but are not limited to, the computation of a sub-network for physical network 820, the performance of traffic classification and discrimination in physical network 820, to mention a few.

Automation gateway 826 then translates these changes into API queries to the various controllers. In some instance, automation gateway 826 provides a multi-controller, multi-vendor abstraction over the underlying network controllers 816.

Because not all actions 842 may be supported by them, automation gateway 826 may also support a "dry run" mode, which allows elastic topology manager 704 to test whether the changes are possible and adjust the plan, accordingly. In various implementations, automation gateway 826 may be activated by a user or via an automation engine in charge of triggering changes after various verifications.

Here, the optimization of physical network 820 does not involve simply reducing its energy consumption at all cost, but doing so such that the QoE/DEX remains at an acceptable level. To this end, elastic topology manager 704 may also take into account QoE telemetry 830 from application experience data sources 840, to assess the impact of changes made in the past. If any adverse effect is noticed, it may revert the changes and adjust any corresponding operational constraints, accordingly. To do so, energy profiling module 822 may also specify which QoE/DEX metrics should be monitored to reflect the user experience in physical network 820.

Should the QoE/DEX become unsatisfactory (e.g., the required SLA for an application is no longer satisfied), elastic topology manager 704 may also undo any of its implemented actions 842, so as to reverse physical network 820 to its previous network state. In such a case, digital twin engine 702 and elastic topology manager 704 may also adjust their algorithms using detailed information about the stored states of 820 before and after triggering the changes along with the noticed impact on the QoE/DEX. Elastic topology manager 704 may then use this negative information to refine its energy saving optimization and corresponding model(s).

As shown in FIGS. 7-8, network optimization process 248 may also include an interface module 708 that allows interested users such as network owner 834 and/or end user 836 to monitor the on-going status of GreenNetAI cloud 802 and its underlying physical network 820. To this end, interface module 708 may provide a user interface and/or API that allow such a user to:

Visualize the saving opportunities that were captured, and those that were not, either due to limitations of the network (e.g., unsupported actions) or due to operational constraints (e.g., double-link failure protection). These opportunities may be mapped onto the different areas of the network and can be explored either in a table (e.g., ordered by saving magnitude, in USD or kg of Co2-eq) or using a topology visualization.

Provide feedback to the system about potential impacts to the user experience. This can be then used to adjust the operational constraints automatically and/or to improve the internal models used by elastic topology manager 704 to infer the impact of the changes.

Soft Sleep Activation of Network Resources in a Green Elastic Network

As would be appreciated, one challenge to taking an action to reduce energy consumption in a green elastic network is that doing so can sometimes cause disruptions in the network. Indeed, network downscaling is at the heart of such elastic networks, meaning that reduced topologies may be used, leading to potential (temporary) disruptions. For example, taking down a network resource may trigger a routing protocol convergence leading to traffic rerouting and, possibly, temporary loops. Traffic shaping or drops will also inevitably disrupt traffic, either temporarily or permanently, leading to impacts on the SLA. To this end, techniques are introduced herein to specify a set of control plane measures that allow for a reduction of the (temporary) SLA disruption, when energy saving actions are triggered in such elastic networks.

Figure 9:
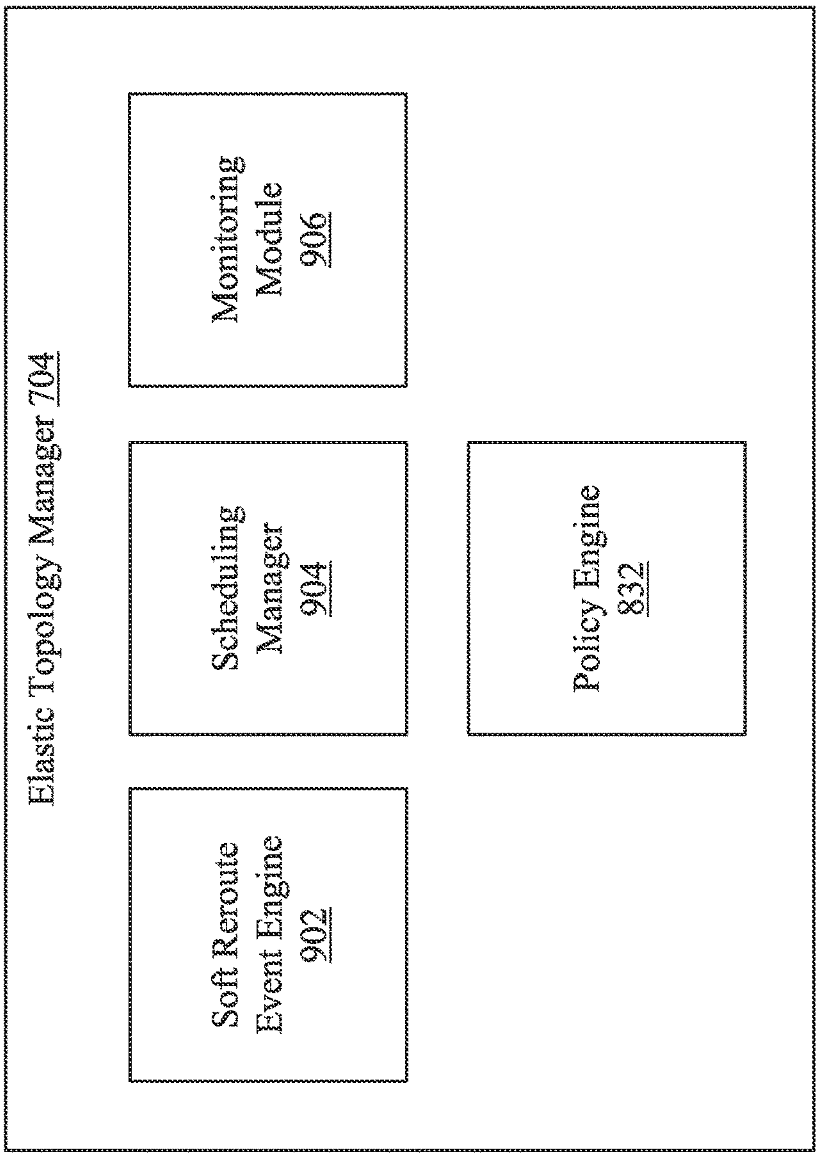
FIG. 9 illustrates an example architecture for soft sleep activation of network resources in a green elastic network.

FIG. 9 illustrates an example architecture 900 for soft sleep activation of network resources in a green elastic network. Continuing the example above of GreenNetAI cloud 802, at the core of architecture 900 is elastic topology manager 704, which may include any or all of the following sub-components: policy engine 832, described previously, a soft reroute event engine 902, a scheduling manager 904, and/or a monitoring module 906, amongst others. As would be appreciated, these sub-components may be combined or omitted, as desired. In addition, in cases in which these sub-components are executed in a distributed manner, the executing devices can be seen as a singular device for purposes of the teachings herein.

According to various embodiments, elastic topology manager 704 may trigger a soft reroute of the resource being taken down as a new policy is being activated by policy engine 832 in physical network 820 through the performance of one or more actions. Here, immediately tearing down the resource (e.g., a link, a router, a Wi-Fi AP, etc.) would unavoidably have an impact on traffic and thus on QoE. Instead, if the soft reroute procedure is activated by policy engine 832, elastic topology manager 704 may initiate any or all of the following steps:

First, soft reroute event engine 902 may generate one or more soft reroute events and send them to the controller (e.g., one of network controllers 816) managing the resources at stake (e.g., vManage for SD-WAN, on-premise wireless controller or eWLC, etc.). Note that the topology of physical network 820 may also require soft reroute event engine 902 to either trigger one set of soft reroute events (SREs) or more, as part of a rerouting strategy, as detailed below.

For optical networks, deactivating lambdas directly impacts link capacity leading to traffic rerouting events at upper (IP/MPLS) layers where, if the IGP cost is dynamically adjusted, all routers in the area trigger a shortest path first (SPF) calculation, leading to micro-loops. In such cases, soft reroute event engine 902 may generate SREs that allow soft reroute of traffic at the IP or MPLS layers, such as the ones detailed in the next paragraphs.

For IP or MPLS links/routers, if the network is IP only, e.g., the Interior Gatweay Protocol (IGP) is Open Shortest Path First (OSPF) or Intermediate System to Intermediate System (ISIS), without a soft reroute event from engine 902 all traffic in transit that is routed across the link/node removed from topology would be dropped, while all other traffic would eventually be rerouted after a certain convergence time. In such a case, soft reroute event engine 902 could proactively empty traffic from the resources being removed by the elastic network. In the case of ISIS, if the removed resource is a router the process could take advantage of the overload bit, effectively removing any transit traffic from the router. In the case of OSPF, all links directly attached to the router would have their cost increased to their maximum value, discouraging peer devices from using this one as transit.

If the network supports MPLS Traffic Engineering (TE), Opportunistic Traffic Engineering Label Switched Path (TE LSP) are created and installed in the network so as to reroute the traffic flowing via the resources being removed from the topology of the elastic network. If the resource is a link, two TE LSPs are created between the routers using that link avoiding the removed link (one for each direction). In the case of the removed router, a set of TE LSPs are created for each 2-hop segment between the neighbors of the impacted router and their Next-Next hop (one TE LSP per direction). Note that the traffic redirected to other paths may lead to some congestion, which is due to the lack of granularity of IP routing. However, this can be mitigated by the use of multiple TE LSPs initiated in various places of the network, each carrying a portion of the traffic thanks to asymmetrical Load Balancing.

For the sake of illustration, consider the example of a single link L being taken away. By increasing the cost of the link, traffic would be rerouted along alternate paths. If a TE LSP is used, a set of TE LSP T1, T2, with bandwidth B1, B2, . . . could be setup from each of the LSR connected to the link along a set of paths. Elastic topology manager 704 could compute the bandwidth of T1, T2, etc, in order to carry traffic traversing path capable of absorbing the traffic load without impacting the traffic SLA. If the network uses a path computation engine (PCE) is used for computation of the set of primary TE LSP, then a custom PCEP PCReq could be sent to the PCE requesting the addition of n TE LSP for a bandwidth equal to the rerouted traffic plus/minor multiplexing margins. Such an addition may lead to the reroute of other TE LSPs potentially using soft preemption. If the request cannot be satisfied (negative reply), TE LSPs with lower bandwidth may be computed by the TE LSP. Note that the custom PCReq message could be sent by soft reroute event engine 902 to either the controller or the PCE itself, in various implementations.

For wireless APs, should an AP be decommissioned by the elastic network in order to save energy while rerouting traffic to other APs without degrading SLA, multiple mechanisms could be employed. Note that in Wi-Fi networks, AP selection is typically performed by the client, not the AP itself. However, 802.11k/v with client steering can be used by the AP to encourage the client associated to it to move to another AP. Here 80211.k allows for signaling information related to the radio environment such as the list of nearby APs, channels, or signal strengths. Accordingly, the SRE generated by soft reroute event engine 902 could use 802.11v (or similar protocol) to send a BSS transition management request, thus encouraging clients to move to a different AP for better performance.

For switched networks, the SRE(s) from soft reroute event engine 902 may adjust the Spanning Tree Configuration to trigger a soft reroute of the traffic (at the cost of temporary loops).

If the network uses Virtual Router Redundancy Protocol (VRRP) or similar protocols, the network may allow for the dynamic election of a router to reach other parts of the network, such as the WAN. A group of routers share a common virtual IP address selected as default gateway by the downstream devices connected to the LAN. The router effectively owning the shared IP address (answering with ARP replies) is dynamically elected. In case of a soft reroute, the priority of the router being taken down may dynamically be lowered, thus encouraging the election of another router and effecting a soft dynamic reroute (note that the preempt mode should be enabled on the router whose priority is increased). Similar mechanisms are used for protocols such as Hot Standby Router Protocol (HSRP), Gateway Load Balancing Protocol (GLBP), Common Address Redundancy Protocol (CARP), or Multi-chassis Link Aggregation Group (MLAG).

Optionally, scheduling manager 904 may be configured to compute scheduling and timing for the SREs from soft reroute event engine 902. As discussed above it may be required to schedule each SRE, in order to further reduce the SLA disruption. Indeed, consider the simple topology A---B----C----D, where the C-D must be removed from the topology. A naïve implementation may first increase the cost of the C-D in order to empty the link from traffic before being taken down. The router C would then first converge, redirecting traffic coming from B to it, thus forming a temporary micro loop until B receives C's LSP/LSA and completes it SPF. Instead, the most upstream router (router D in this example) should first increase its cost followed by downstream router (router C). To this end, scheduling manager 904 may carefully schedule the SREs, accordingly.

Optionally, monitoring module 906 may track the network resources and overall QoE for the traffic during an SRE generated by soft reroute event engine 902, if SLA disruption is a concern. In this case, monitoring module 906 may send a custom message to the controller in charge of managing the network to request it to gather statistics about the network states reflecting the QoE. For example, monitoring module may request that the controller monitor the traffic load, packet loss, and jitter for all interfaces carrying extra traffic due to the soft reroute prior to taking out the resources. In addition, additional systems in charge of tracking application QoE such as ThousandEyes, Cisco DNA Center, vAnalytics or FSO may be involved in the process.

Should monitoring module 906 observe SLA degradation (or no SLA degradation but a substantial impact on network resources), soft reroute event engine 902 may use this information to improve its computation of SREs. For example, soft reroute event engine 902 may determine that the SRE should be adjusted since the process triggered an impact on SLA that was not anticipated and that is outside of the acceptable range. Adjustments may consist in rerouting more traffic along potential a broader set of paths (using, for example, a large number of TE LSPs across which rerouted traffic will be load balanced).

Figure 10:
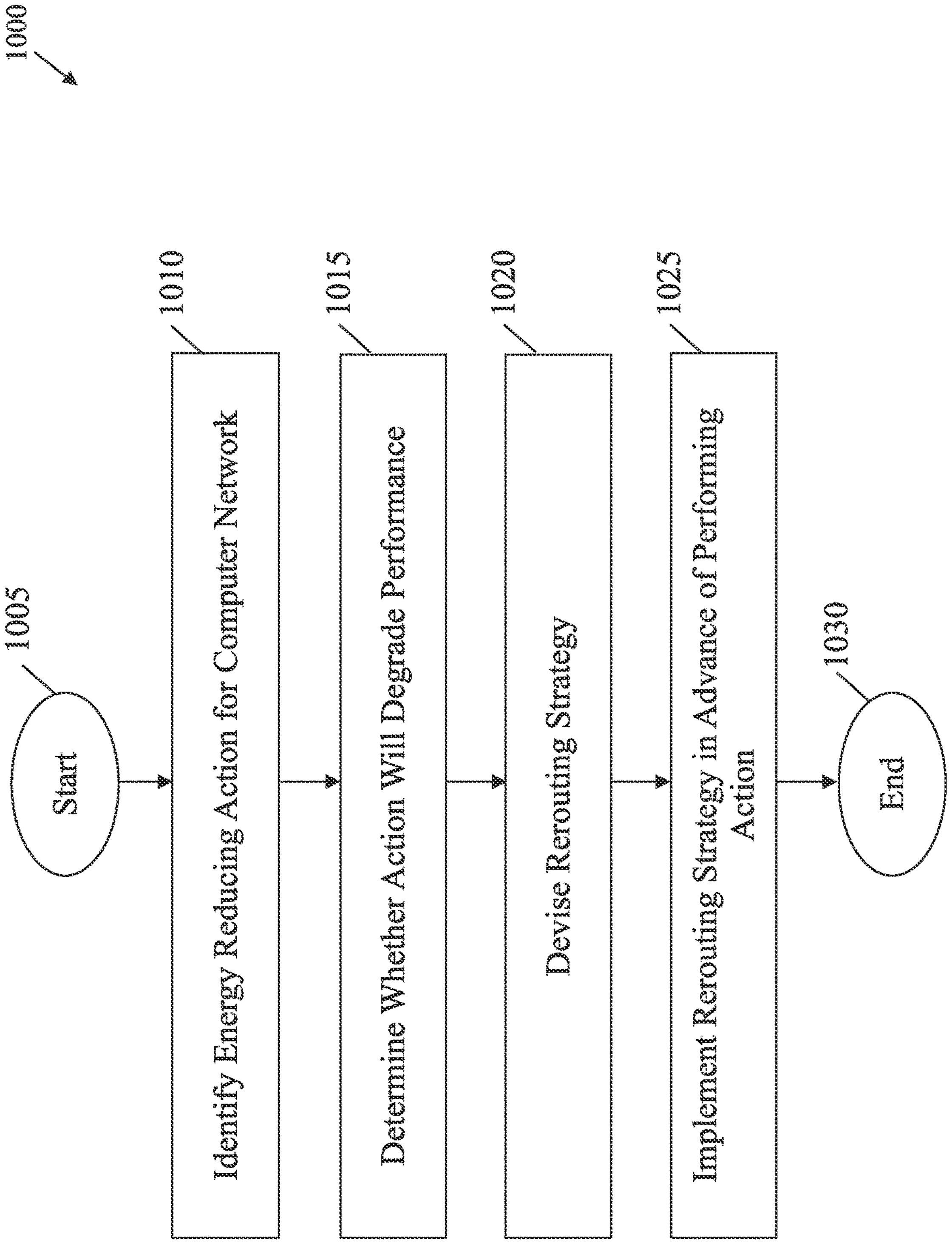
FIG. 10 illustrates an example simplified procedure for soft sleep activation of network resources in a green elastic network.

FIG. 10 illustrates an example simplified procedure (e.g., a method) for soft sleep activation of network resources in a green elastic network, in accordance with one or more implementations described herein. For example, a non-generic, specifically configured device (e.g., device 200), such as a router, firewall, controller for a network (e.g., an SDN controller or other device in communication therewith, s cloud controller, etc.), server, or the like, may perform procedure 1000 by executing stored instructions (e.g., network optimization process 248). In some instances, a set of distributed, specifically configured devices may also perform procedure 1000, in which case the set of devices can themselves be viewed as a singular device for purposes of the teachings herein. The procedure 1000 may start at step 1005, and continues to step 1010, where, as described in greater detail above, the device may identify an action to be performed in a computer network to reduce energy consumption by the computer network. In some implementations, the action removes a resource from the computer network and the rerouting strategy reroutes traffic away from that resource. For instance, the action may power down an interface, remove a router from the topology of the computer network, etc.

At step 1015, as detailed above, the device may determine whether performance of the action in the computer network will result in a performance degradation in the computer network. Typically, this may be the case when traffic is flowing through a resource that is to be removed from the computer network by the action.

At step 1020, the device may devise a rerouting strategy for the computer network, when performance of the action in the computer network will result in a performance degradation, as described in greater detail above. In some implementations, the rerouting strategy comprises a series of change to be applied to the computer network at scheduled times.

At step 1025, as detailed above, the device may implement the rerouting strategy in advance of performance of the action in the computer network, to mitigate against the performance degradation. The device may do so either directly or indirectly, such as by instruction another entity in the computer network to perform actions in accordance with the rerouting strategy. In some implementations, the device may do so by causing an Intermediate System to Intermediate System (ISIS) protocol message to be sent in the computer network with an overload bit set. In other implementations, the device may do so by causing Open Shortest Path First weights of links attached to a resource being removed from the computer network by the action to be maximized. In a further implementation, the device may do so by causing a wireless access point in the computer network to perform client steering. In an additional implementation, the device may do so by adjusting a spanning tree configuration of the computer network. In a further implementation, the device may do so by lowering a priority of a resource affected by the action to be performed. In one implementation, the device may do so by sending an instruction to a network controller for the computer network. In some cases, the device may also determine whether implementation of the rerouting strategy has caused degraded performance in the computer network and, if so, adjust the rerouting strategy in advance of performance of the action in the computer network.

Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, introduce approaches for soft sleep activation of network resources in a green elastic network, according to specific constraints and objectives. This approach to maintaining DEX/QoE leverages digital twins, various models (e.g., for energy consumption, etc.), network state retrievals, and/or the monitoring of network QoE and SLA metrics in the form of positive/negative feedback.

According to various embodiments, a method is introduced herein comprising identifying, by a device, an action to be performed in a computer network to reduce energy consumption by the computer network. The method may also comprise determining, by the device, whether performance of the action in the computer network will result in a performance degradation in the computer network. The method may further comprise devising, by the device, a rerouting strategy for the computer network, when performance of the action in the computer network will result in a performance degradation. The method may additionally comprise implementing, by the device, the rerouting strategy in advance of performance of the action in the computer network, to mitigate against the performance degradation.

In some embodiments, the action removes a resource from the computer network and the rerouting strategy reroutes traffic away from that resource. In another embodiment, implementing the rerouting strategy comprises causing an Intermediate System to Intermediate System (ISIS) protocol message to be sent in the computer network with an overload bit set. In another embodiment, implementing the rerouting strategy comprises causing Open Shortest Path First weights of links attached to a resource being removed from the computer network by the action to be maximized. In a further embodiment, the method further comprises determining whether implementation of the rerouting strategy has caused degraded performance in the computer network and, if so, adjusting the rerouting strategy in advance of performance of the action in the computer network. In some embodiments, implementing the rerouting strategy comprises causing a wireless access point in the computer network to perform client steering. In another embodiment, implementing the rerouting strategy comprises adjusting a spanning tree configuration of the computer network. In some embodiments, implementing the rerouting strategy comprises lowering a priority of a resource affected by the action to be performed. In one embodiment, the rerouting strategy comprises a series of change to be applied to the computer network at scheduled times. In yet another embodiment, implementing the rerouting strategy comprises sending an instruction to a network controller for the computer network.

Further, according to the embodiments herein an apparatus herein may comprise: one or more network interfaces to communicate with a network; a processor coupled to the one or more network interfaces and configured to execute one or more processes; and a memory configured to store a process executable by the processor, the process, when executed, configured to identify an action to be performed in a computer network to reduce energy consumption by the computer network. The process when executed is also configured to determine whether performance of the action in the computer network will result in a performance degradation in the computer network. When executed, the process is further configured to devise a rerouting strategy for the computer network, when performance of the action in the computer network will result in a performance degradation. The process when executed is additionally configured to implement the rerouting strategy in advance of performance of the action in the computer network, to mitigate against the performance degradation.

According to the embodiments herein, a tangible, non-transitory, computer-readable medium herein may have program instructions stored thereon that, when executed by a device, may cause the computer to perform a method comprising identifying, by the device, an action to be performed in a computer network to reduce energy consumption by the computer network. The method may also comprise determining, by the device, whether performance of the action in the computer network will result in a performance degradation in the computer network. The method may further comprise devising, by the device, a rerouting strategy for the computer network, when performance of the action in the computer network will result in a performance degradation. The method may additionally comprise implementing, by the device, the rerouting strategy in advance of performance of the action in the computer network, to mitigate against the performance degradation.

While there have been shown and described illustrative implementations that provide for soft sleep activation of network resources in a green elastic network, it is to be understood that various other adaptations and modifications may be made within the spirit and scope of the implementations herein. For example, while certain network adaptations are described herein with respect to achieving reduced resource consumption, examples are not limited as such and may involve other modifications, in other implementations. Likewise, a wide variety of resource consumption metrics may be targeted for minimization alongside or instead of those describe herein. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:

identifying, by a device, an action to be performed in a computer network to reduce energy consumption by the computer network;

determining, by the device, whether performance of the action in the computer network will result in a performance degradation in the computer network;

devising, by the device, a rerouting strategy for the computer network, when performance of the action in the computer network will result in the performance degradation;

implementing, by the device, the rerouting strategy in advance of performance of the action in the computer network, to mitigate against the performance degradation; and monitoring, by the device, traffic load, packet loss, and jitter for interfaces carrying traffic affected by the rerouting strategy, prior to performance of the action in the computer network.

2. The method as in claim 1, wherein the action removes a resource from the computer network and the rerouting strategy reroutes traffic away from that resource.

3. The method as in claim 1, wherein implementing the rerouting strategy comprises:

causing an Intermediate System to Intermediate System (ISIS) protocol message to be sent in the computer network with an overload bit set.

4. The method as in claim 1, wherein implementing the rerouting strategy comprises:

causing Open Shortest Path First weights of links attached to a resource being removed from the computer network by the action to be maximized.

5. The method as in claim 1, further comprising:

determining, during implementation of the rerouting strategy and prior to performance of the action in the computer network, whether implementation of the rerouting strategy has caused degraded performance in the computer network; and, if so, adjusting the rerouting strategy in advance of performance of the action in the computer network to maintain service level agreement compliance.

6. The method as in claim 1, wherein implementing the rerouting strategy comprises:

causing a wireless access point in the computer network to perform client steering.

7. The method as in claim 1, wherein implementing the rerouting strategy comprises:

adjusting a spanning tree configuration of the computer network.

8. The method as in claim 1, wherein implementing the rerouting strategy comprises:

lowering a priority of a resource affected by the action to be performed.

9. The method as in claim 1, wherein the rerouting strategy comprises a series of changes to be applied to the computer network at scheduled times, wherein the series of changes are ordered based on topological positions of network resources in the computer network to minimize service level agreement disruption during implementation of the rerouting strategy.

10. The method as in claim 1, wherein implementing the rerouting strategy comprises:

sending an instruction to a network controller for the computer network.

11. An apparatus, comprising:

one or more network interfaces;

a processor coupled to the one or more network interfaces and configured to execute one or more processes; and a memory configured to store a process that is executable by the processor, the process when executed configured to:

identify an action to be performed in a computer network to reduce energy consumption by the computer network;

determine whether performance of the action in the computer network will result in a performance degradation in the computer network;

devise a rerouting strategy for the computer network, when performance of the action in the computer network will result in the performance degradation;

implement the rerouting strategy in advance of performance of the action in the computer network, to mitigate against the performance degradation; and monitor traffic load, packet loss, and jitter for interfaces carrying traffic affected by the rerouting strategy, prior to performance of the action in the computer network.

12. The apparatus as in claim 11, wherein the action removes a resource from the computer network and the rerouting strategy reroutes traffic away from that resource.

13. The apparatus as in claim 11, wherein the apparatus implements the rerouting strategy by:

causing an Intermediate System to Intermediate System (ISIS) protocol message to be sent in the computer network with an overload bit set.

14. The apparatus as in claim 11, wherein the apparatus implements the rerouting strategy by:

causing Open Shortest Path First weights of links attached to a resource being removed from the computer network by the action to be maximized.

15. The apparatus as in claim 11, wherein the process when executed is further configured to:

determining whether implementation of the rerouting strategy has caused degraded performance in the computer network; and, if so, adjusting the rerouting strategy in advance of performance of the action in the computer network.

16. The apparatus as in claim 11, wherein the apparatus implements the rerouting strategy by:

causing a wireless access point in the computer network to perform client steering.

17. The apparatus as in claim 11, wherein the apparatus implements the rerouting strategy by:

adjusting a spanning tree configuration of the computer network.

18. The apparatus as in claim 11, wherein the apparatus implements the rerouting strategy by:

lowering a priority of a resource affected by the action to be performed.

19. The apparatus as in claim 11, wherein the rerouting strategy comprises a series of changes to be applied to the computer network at scheduled times.

20. A tangible, non-transitory, computer-readable medium storing program instructions that cause a device to execute a process comprising:

identifying, by the device, an action to be performed in a computer network to reduce energy consumption by the computer network;

determining, by the device, whether performance of the action in the computer network will result in a performance degradation in the computer network;

devising, by the device, a rerouting strategy for the computer network, when performance of the action in the computer network will result in the performance degradation;

implementing, by the device, the rerouting strategy in advance of performance of the action in the computer network, to mitigate against the performance degradation, and monitoring, by the device, traffic load, packet loss, and jitter for interfaces carrying traffic affected by the rerouting strategy, prior to performance of the action in the computer network.

* * * * *